US011965368B2

(12) United States Patent
Arnold

(10) Patent No.: US 11,965,368 B2
(45) Date of Patent: Apr. 23, 2024

(54) SLIDING DOOR ROLLER FITTING AND ASSOCIATED SLIDING DOOR ARRANGEMENT

(71) Applicant: Häfele SE & Co KG, Nagold (DE)

(72) Inventor: Lorenz Arnold, Unteraegeri (CH)

(73) Assignee: Häfele SE & Co KG, Nagold (DE)

( * ) Notice: Subject to any disclaimer, the term of this patent is extended or adjusted under 35 U.S.C. 154(b) by 0 days.

(21) Appl. No.: 17/930,387

(22) Filed: Sep. 7, 2022

(65) Prior Publication Data

US 2023/0129566 A1 Apr. 27, 2023

(30) Foreign Application Priority Data

Oct. 27, 2021 (EP) .................................... 21205101

(51) Int. Cl.
*E05D 15/10* (2006.01)
*E05D 15/58* (2006.01)

(52) U.S. Cl.
CPC ........... *E05D 15/10* (2013.01); *E05D 15/581* (2013.01); *E05D 2015/1028* (2013.01)

(58) Field of Classification Search
CPC ........ E05D 2015/1028; E05D 15/1065; E05D 15/10; E05D 15/1042; E05D 2015/1049; E05D 2015/1036; E05D 15/565
See application file for complete search history.

(56) References Cited

U.S. PATENT DOCUMENTS

| | | | | |
|---|---|---|---|---|
| 909,602 | A * | 1/1909 | Hussey | 16/99 |
| 2,740,168 | A * | 4/1956 | Wright | E05D 15/1042 49/222 |
| 4,457,108 | A * | 7/1984 | Kuschel | E05F 15/565 49/213 |
| 6,052,944 | A * | 4/2000 | Louda | E05D 15/1065 49/212 |
| 6,442,900 | B1 * | 9/2002 | Kvasnes | E05D 15/1042 49/410 |
| 11,371,274 | B2 * | 6/2022 | Li | E05D 15/1042 |

FOREIGN PATENT DOCUMENTS

| | | | | |
|---|---|---|---|---|
| DE | 35 45 971 | C1 | 2/1987 | |
| EP | 0 027 261 | A1 | 4/1981 | |
| EP | 1571282 | A2 * | 9/2005 | E05B 17/0025 |

* cited by examiner

*Primary Examiner* — Daniel J Troy
*Assistant Examiner* — Susan M. Heschel
(74) *Attorney, Agent, or Firm* — Orbit IP

(57) ABSTRACT

A sliding door roller fitting includes a tilting lever having a long and short arm angled thereto. The long arm has a freely rotatably mounted running roller which projects beyond the long arm to roll along a running rail. The short arm has an outwardly curved outer side facing away from the running roller. The tilting lever is held on a sliding door-side bearing body and is tiltable between two end positions about a tilting axis parallel to a running roller tangent. The bearing body has at least one planar bearing surface which extends horizontally in the setting-out direction in the mounting position of the bearing body. The short arm of the tilting lever bears by its curved outer side against the bearing surface and rolls thereon during tilting of the tilting lever. The bearing body has two driving stops between which the tilting lever is arranged.

16 Claims, 4 Drawing Sheets

SLIDING DOOR ROLLER FITTING AND ASSOCIATED SLIDING DOOR ARRANGEMENT

CROSS-REFERENCE TO RELATED APPLICATIONS

This application claims priority to European Patent Application EP 21 205 101.5 filed on Oct. 27, 2021, the entire contents of which are hereby incorporated in full by this reference.

DESCRIPTION

Field of the Invention

The invention relates to a sliding door roller fitting, suitable for the parallel setting out of a vertical sliding door, which is guided displaceably along a horizontal running rail, in a setting-out direction extending at a right angle to the sliding door plane, and also to an associated sliding door arrangement having at least one sliding door which can be set out parallel.

Background of the Invention

Such sliding door roller fittings and sliding door arrangements are sufficiently well known and generally have a complicated construction with many movable individual parts.

Against this background, the object on which the present invention is based is to specify a sliding door roller fitting which has as few individual parts as possible and is constructed in as simple a manner as possible. In particular, the sliding door roller fitting is intended to prevent lowering or lifting of the sliding door during the setting-out movement.

SUMMARY OF THE INVENTION

This object is achieved according to the invention by a sliding door roller fitting, comprising: a tilting lever having a long arm and a short arm which is angled, in particular at a right angle, thereto, wherein the long arm has, on its inner side facing the short arm, a freely rotatably mounted running roller which, on the roller side opposite the short arm, projects beyond the long arm in order to roll along a running rail, and wherein the short arm has an outwardly curved outer side facing away from the running roller; and a (sliding door-side) bearing body which is to be fastened to the sliding door and on which the tilting lever is held so as to be tiltable between two end positions about a tilting axis parallel to a running roller tangent, wherein the bearing body has a planar bearing surface which extends horizontally in the setting-out direction in the mounting position of the bearing body, wherein the short arm of the tilting lever bears by its curved outer side against the bearing surface and rolls thereon during tilting of the tilting lever, and wherein the bearing body has two driving stops between which the tilting lever, in particular the short arm, is arranged in order to be driven along bidirectionally in the setting-out direction by the bearing body.

According to the invention, the curved outer surface rolls on the horizontal bearing surface during the tilting movement.

With very particular preference, the curved outer side is cylindrical and lies on a radius of curvature whose centre point is provided by the running roller tangent of the rolling point, which projects furthest beyond the long arm, of the running roller. The respective rolling contact always lies vertically above the running rail and, by virtue of the radius of curvature, there occurs no lowering or lifting of the sliding door. Consequently, the force required for transversely moving the sliding door is very low, even in the case of heavy sliding doors.

If the tilting lever is in a middle position between its two end positions, the axis of rotation of the running roller preferably extends parallel to the setting-out direction, that is to say horizontally in the mounting position of the sliding door roller fitting.

The tilting lever is preferably L-shaped with a short arm angled on one side, but can alternatively, for example, also be T-shaped with two short arms angled on both sides.

In a particularly preferred embodiment, the two ends, which point in the setting-out direction, of the short arm of the tilting lever are rounded and mounted so as to be tiltable between and on the two driving stops. Here, the rounded ends and the driving stops are formed from material whose friction is minimized as far as possible.

The two end positions of the tilting lever are preferably defined by end stops of the bearing body against which at least one of the two arms of the tilting lever bears in each case in the two end positions.

The bearing body preferably has a bearing cavity in which the short arm of the tilting lever is tiltably mounted. The bearing cavity can have the bearing surface, the driving stops and optionally also end stops against which the short arm of the tilting lever bears in each case in the two end positions.

At least on one side of the running roller, in particular on both sides of the running roller, the bearing body particularly preferably has an axle pin which is mounted so as to be rotatable in the bearing body about an axis of rotation extending parallel to the tilting axis, wherein the pivoting movement of the tilting lever and the rotation of the axle pin are movement-coupled to one another, in particular by means of a lever mechanism or toothed wheel mechanism. For this purpose, the axle pin can, for example, have a radial pivoting lever on which the tilting lever, in particular the long arm, acts eccentrically. The axle pin serves for synchronizing the tilting lever movements of two adjacent sliding door roller fittings.

In an advantageous invention variant, the bearing body is formed from two bearing body halves which are assembled in the axial direction of the tilting axis of the tilting lever, in particular are plugged one into the other, and which each have mutually facing bearing cavities in which the short arm of the tilting lever is tiltably mounted. The two bearing body halves can be arranged and thus held together in a sliding door-side mounting housing from which the rolling side of the running roller projects.

With particular preference, the bearing body is guided displaceably in a sliding door-side mounting housing at a right angle to the bearing surface. An adjusting screw which is supported, on the one hand, on the bearing body and, on the other hand, on the mounting housing can be used to set how far the bearing body can be inserted into the mounting housing. The sliding door can thus be adjusted in terms of height by way of the adjusting screw.

A wedge element having an end-side wedge surface which, in the mounted state, is arranged laterally in front of an end side of the sliding door is preferably fastened to the sliding door roller fitting.

The invention finally also relates to a sliding door arrangement, comprising: at least one stationary wall 40;

and at least one sliding door 6*a* which can be shifted parallel to the stationary wall 40 and is guided displaceably in a horizontal lower and a horizontal upper running rail by means of at least two lower and two upper sliding door roller fittings designed as above whose bearing bodies are each fastened to the sliding door 6*a* and whose running rollers are each guided in the respective running rails; wherein the sliding door 6*a* can be set out parallel in a horizontal setting-out direction, which extends at a right angle to the sliding door plane, between a setting-out position, in which the tilting lever is tilted into the one end position, and a setting-out position, in which the tilting lever is tilted into the other end position, and wherein, if the sliding door 6*a* is in its one setting-out position, the sliding door 6*a* abuts the stationary wall 40 in the setting-out direction, in particular in a sealed manner, or is flush with the stationary wall 40, in particular in a sealed manner, and, if the sliding door 6*a* is in its other setting-out position, is spaced apart from the stationary wall 40 in the setting-out direction to such an extent that it can be slid past the stationary wall 40.

An essential advantage of the sliding door arrangement according to the invention is that the sliding door when moved in the setting-out direction can be closed in a sealed manner by means of a seal which is present between the stationary wall or door fold and the sliding door.

The invention finally also relates to a sliding door arrangement, comprising: at least two parallel horizontal, lower running rails and at least two parallel horizontal, upper running rails; at least one first sliding door which is guided displaceably in the front running rail of the two lower running rails and in the front running rail of the two upper running rails by means of at least two lower and two upper sliding door roller fittings; and at least one second sliding door which is guided displaceably in the rear running rail of the two lower running rails and in the rear running rail of the two upper running rails by means of at least two lower and two upper sliding door roller fittings; wherein at least one of the first and second sliding doors is guided displaceably by means of at least two lower and two upper sliding door roller fittings designed as above whose bearing bodies are each fastened to the at least one sliding door and whose running rollers are each guided in the respective running rails, wherein the at least one sliding door can be set out parallel in a horizontal setting-out direction, which extends at a right angle to the sliding door plane, between a setting-out position, in which the tilting lever is tilted into the one end position, and a setting-out position, in which the tilting lever is tilted into the other end position, and wherein, if the at least one sliding door is in its one setting-out position, the two sliding doors are flush with one another and, if the at least one sliding door is in its other setting-out position, are spaced apart from one another in the setting-out direction to such an extent that they can be slid past one another.

According to the invention, either only one of the two sliding doors or both sliding doors can be set out parallel.

Preferably, the first sliding door is guided displaceably by means of at least two lower and two upper sliding door roller fittings designed as above whose bearing bodies are each fastened to the first sliding door and whose running rollers are each guided in the lower and upper running rails, wherein the first sliding door can be set out parallel in a horizontal setting-out direction, which extends at a right angle to the sliding door plane, between a rear setting-out position, in which the tilting lever is tilted into the one end position, and a front setting-out position, in which the tilting lever is tilted into the other end position. The second sliding door is guided displaceably by means of at least two lower and two upper sliding door roller fittings designed as above whose bearing bodies are each fastened to the second sliding door and whose running rollers are each guided in the lower and upper running rails, wherein the second sliding door can be set out parallel in the setting-out direction between a front setting-out position, in which the tilting lever is tilted into the one end position, and a rear setting-out position, in which the tilting lever is tilted into the other end position. If the first sliding door is in its rear setting-out position and the second sliding door is in its front setting-out position, the two sliding doors are flush with one another and, if the first sliding door is in its front setting-out position and the second sliding door is in its rear setting-out position, are spaced apart from one another in the setting-out direction to such an extent that they can be slid past one another.

In the case of sliding door roller fittings having axle pins, the mutually facing axle pins of two lower sliding door roller fittings of a sliding door and the mutually facing axle pins of two upper sliding door roller fittings of a sliding door are each connected to one another by means of a connecting rod and thus rotationally coupled. Even if a setting-out displacement is initiated only on one side of the sliding door, this setting-out displacement is also transmitted to the other side of the sliding door by means of the connecting rod, with the result that the sliding door is always set out parallel.

In different embodiment variants of the sliding door arrangement according to the invention, there is either provision that the sliding doors stand on and roll on the lower running rails by means of the lower sliding door roller fittings or provision that the sliding doors are suspended in and roll on the upper running rails by means of the upper sliding door roller fittings.

Further advantages of the invention are evident from the description, the claims and the drawing. Similarly, the features mentioned above and those still to be further presented can be used in each case individually or together in any desired combinations. The embodiments shown and described should not be understood as an exhaustive enumeration, but rather are of exemplary character for outlining the invention.

DETAILED DESCRIPTION OF THE PREFERRED EMBODIMENTS

Figure 1:
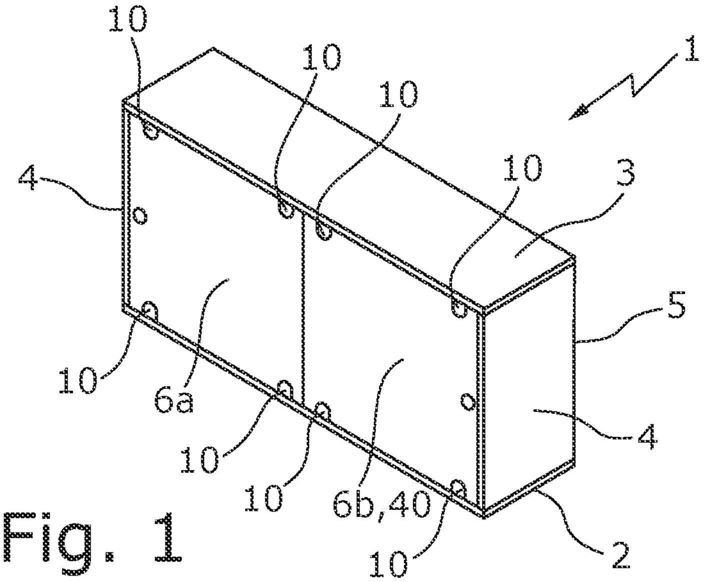
FIG. 1 shows a sliding door arrangement according to the invention using the example of a sliding door cabinet having two sliding doors arranged next to one another in their flush, closed starting position.

The sliding door arrangement shown in FIG. 1 is shown using the example of a sliding door cabinet 1 having a base 2, an upper panel 3, two side walls 4 and a rear wall 5. On the front side, the sliding door cabinet 1 has two sliding doors 6*a*, 6*b* which in FIG. 1 are shown next to one another in their flush, closed starting position.

Figure 2A:
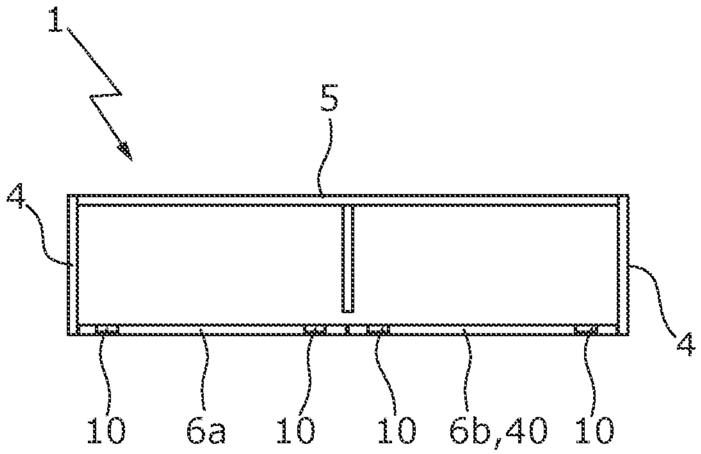
FIGS. 2*a*, 2*b* show the sliding door cabinet shown in FIG. 1 with the two sliding doors arranged flush next to one another in a plan view from above with the upper panel not shown (FIG. 2*a*) and in a cross-sectional view (FIG. 2*b*)
Figure 2B:
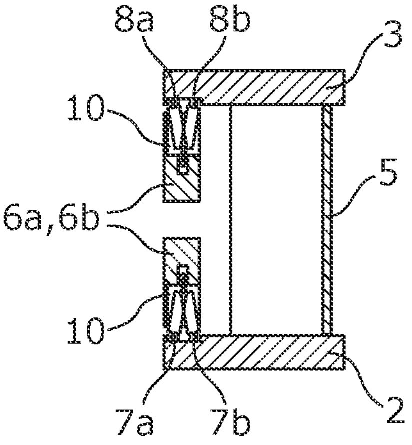
Figure 3A:
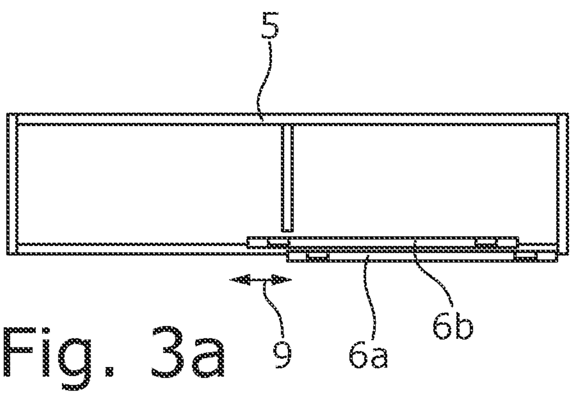
FIGS. 3*a*, 3*b* show the sliding door cabinet shown in FIG. 1 with the two sliding doors set out parallel in a direction away from one another in a plan view from above with the upper panel not shown (FIG. 3*a*) and in a cross-sectional view (FIG. 3*b*)
Figure 3B:
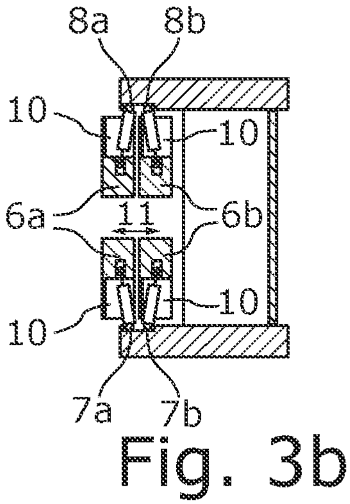
Figure 4:
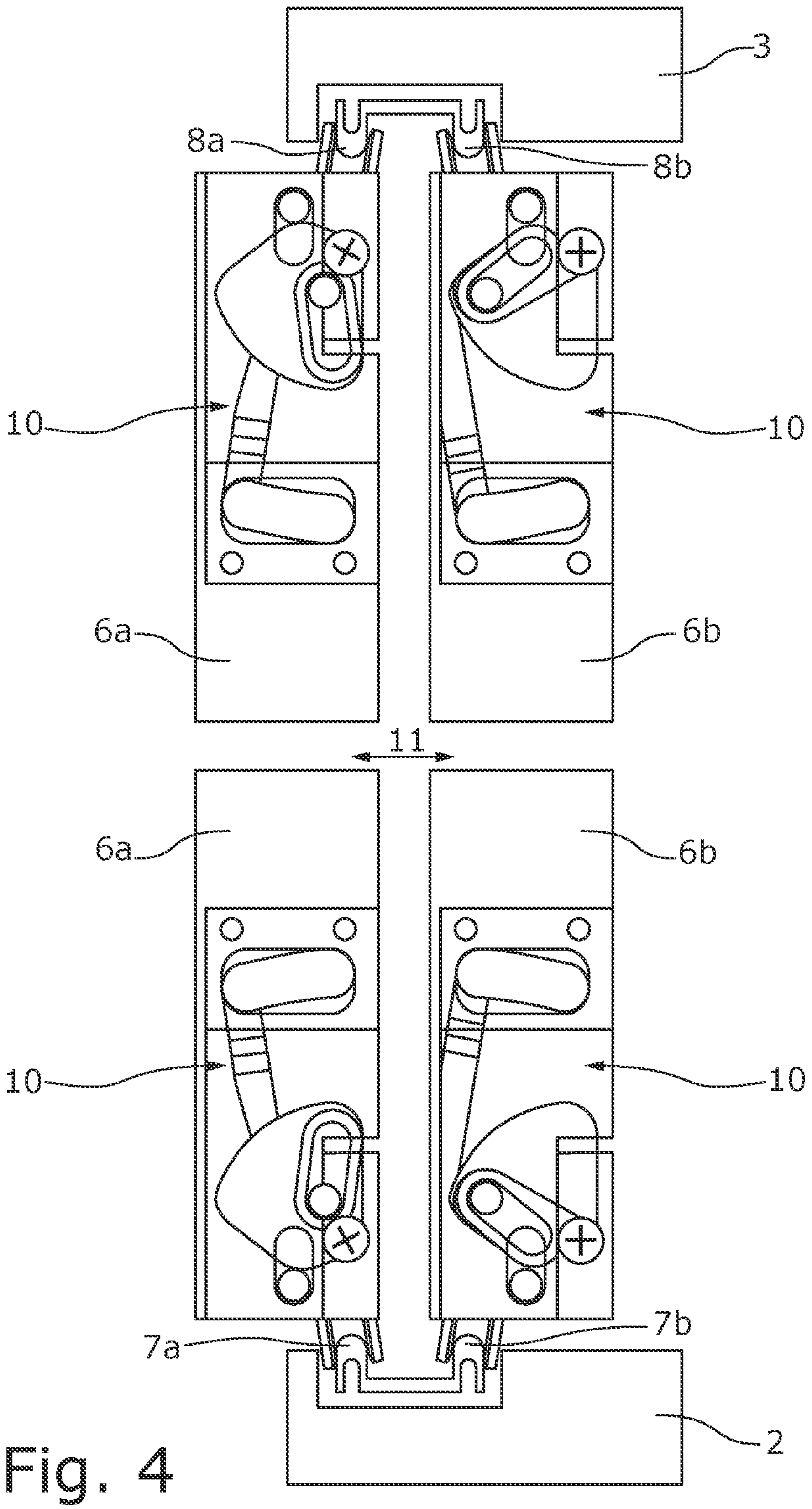
FIG. 4 shows an enlarged view of FIG. 3*b;*

As shown in FIGS. 2*a*, 2*b* and FIGS. 3*a*, 3*b*, a rail profile having two parallel horizontal, lower running rails 7*a*, 7*b* is arranged in an upper-side groove of the base 2, and a rail profile having two parallel horizontal, upper running rails 8*a*, 8*b* is arranged in a lower-side groove of the upper panel 3. The sliding door 6*a* on the left in FIG. 3*b* is guided displaceably in the direction of the double arrow 9 in the front, lower and upper running rails 7*a*, 8*a*, and the right sliding door 6*b* is guided displaceably in the direction of the double arrow 9 in the rear, lower and upper running rails 7*b*, 8*b*, specifically in each case by means of two lower and two upper sliding door roller fittings 10 which, as shown in FIG. 1, are in each case mounted on the right and left on the sliding doors 6*a*, 6*b*. By means of the sliding door roller fittings 10, the sliding door 6*a* on the left in FIG. 3*b* can be set out parallel forwardly into a front setting-out position from the starting position in a horizontal setting-out direction (double arrow 11) extending at a right angle to the vertical sliding door plane, and the right sliding door 6*b* can be set out parallel rearwardly into a rear setting-out position from the starting position in the horizontal setting-out direction 11.

The front running rail 7*a*, 8*a* and the rear running rail 7*b*, 8*b* can be either formed by a single dual track running rail or by two separate running rails.

Figure 5:
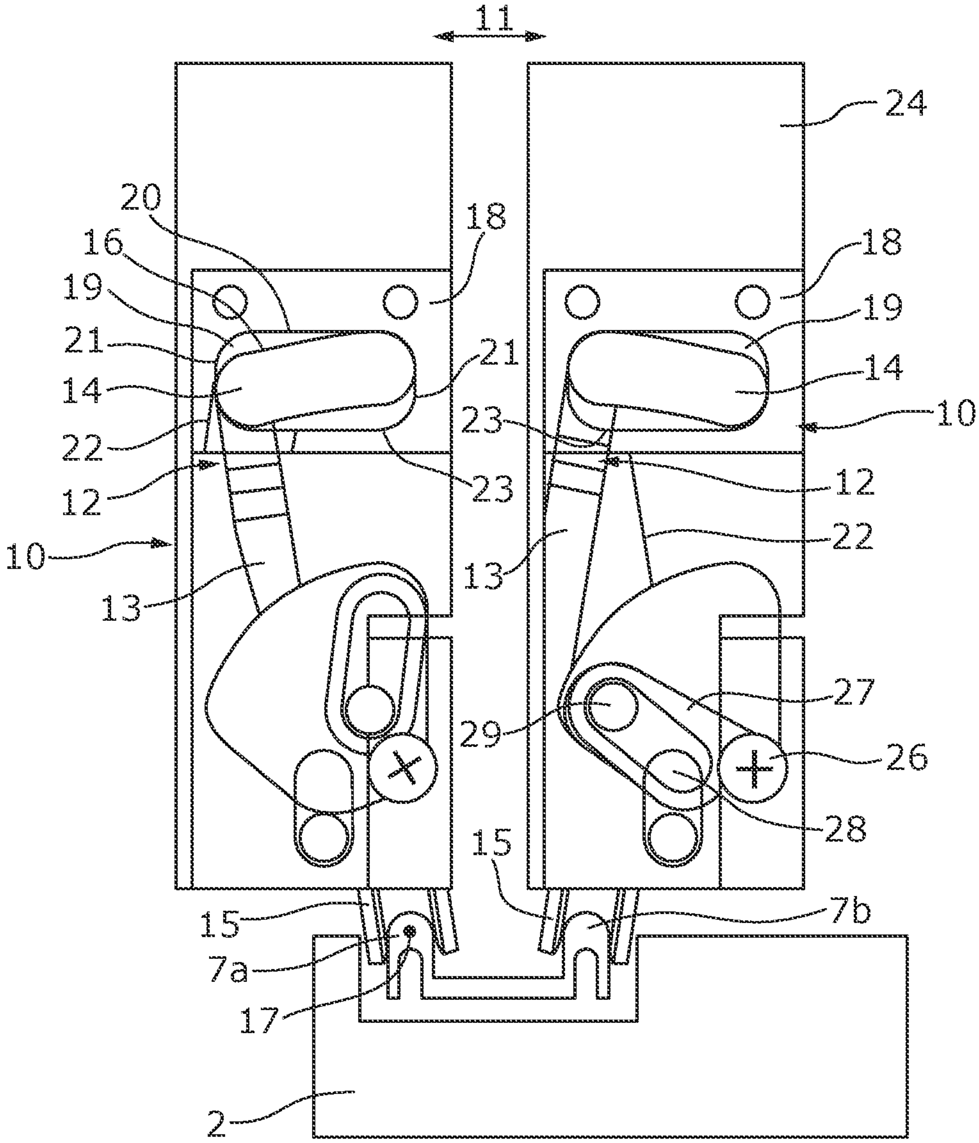
FIG. 5 shows a detailed view of the lower region of FIG. 4 with two sliding door roller fittings according to the invention for the parallel setting-out of the vertical sliding doors, which are guided displaceably along the horizontal running rails, in a horizontal setting-out direction.

The sliding door roller fitting 10 for the parallel setting-out of the vertical sliding doors 6*a*, 6*b* which are guided displaceably along the horizontal running rails 7*a*, 7*b*, 8*a*, 8*b* in the setting-out direction 11 has, as shown in FIG. 5, an L-shaped tilting lever 12 having a long arm 13 and a short arm 14 angled, in particular at a right angle, thereto. The long arm 13 has, on its inner side facing the short arm 14, a freely rotatably mounted running roller 15 which, on the roller side opposite the short arm 14, projects beyond the long arm 13 in order to roll along the running rail 7*a*, 7*b*. The short arm 14 has, facing away from the running roller 15, an outwardly curved outer side 16 which is optionally cylindrical and lies on a radius of curvature R (FIG. 6) whose centre point is provided by the running roller tangent 17 of the rolling point, which projects furthest beyond the long arm 13, of the running roller 15.

The sliding door roller fitting 10 additionally has a sliding door-side bearing body 18 having a bearing cavity 19 which is open on the end side and in which the tilting lever 12 is held so as to be tiltable between two end positions about a tilting axis parallel to the running roller tangent 17. The bearing cavity 19 has a planar bearing surface 20 which extends horizontally in the setting-out direction 11 in the mounting position of the bearing body 18 and against which the short arm 14 of the tilting lever 12 bears by its curved outer side 16 and rolls thereon during the tilting of the tilting lever 12. The bearing cavity 19 also has two (vertical) driving stops 21 between which the short arm 14 is arranged in order to be driven along bidirectionally in the setting-out direction 11 by the bearing body 18. The two ends of the short arm 14 that point in the setting-out direction 11 are rounded and slide on the two driving stops 21, with the result that the tilting lever 12 is tiltably mounted. The two end positions of the tilting lever 12 are defined by end stops 22 of the bearing body 18 against which the long arm 13 bears in each case in the two end positions. Alternatively or additionally, as in the exemplary embodiment shown, the bearing cavity 19 can also have end stops 23 against which the short arm 14 of the tilting lever 12 bears in each case in the two end positions.

Figure 7:
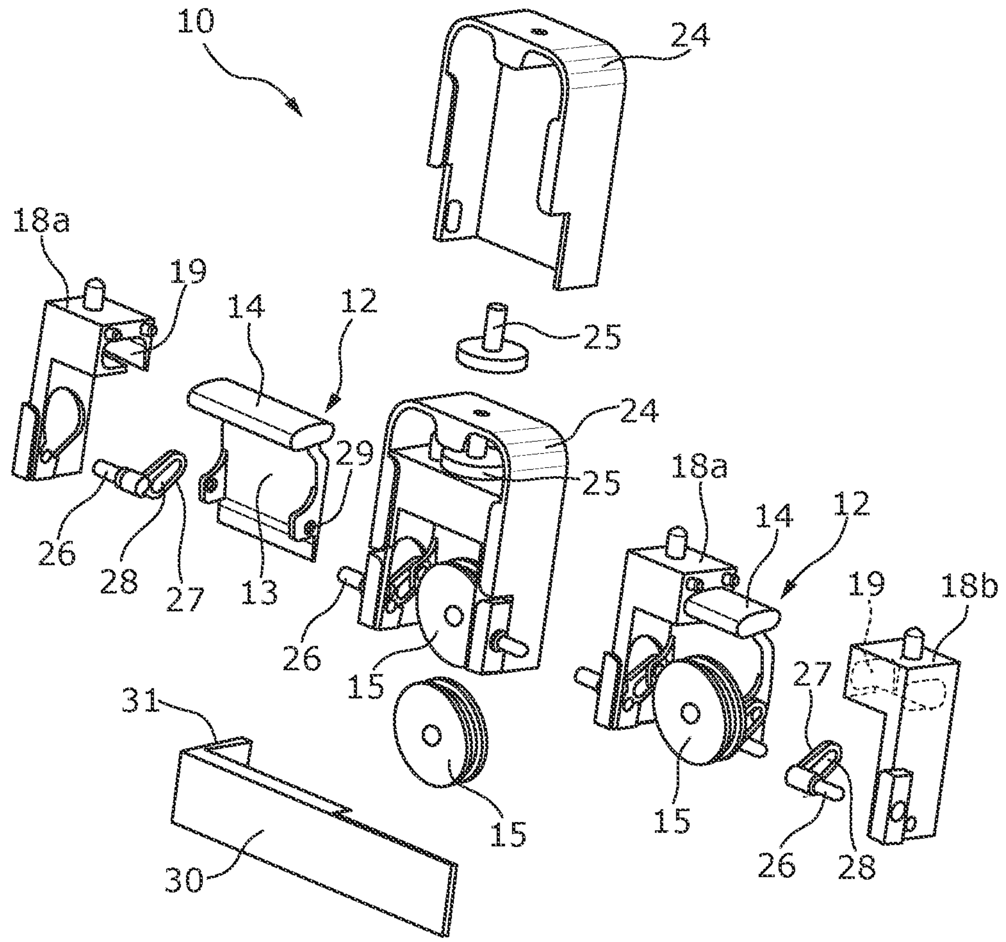
FIG. 7 shows an exploded illustration of the sliding door roller fitting according to the invention.

The bearing body 18 can be a one-piece part or, as shown in FIG. 7, is formed from two bearing body halves 18*a*, 18*b* which are assembled in the axial direction of the tilting or rolling axis of the tilting lever 12, in particular are plugged together, and which each have mutually facing bearing cavities 19 in which the short arm 14 of the tilting lever 12 is tiltably mounted. The two bearing body halves 18*a*, 18*b* are arranged and thus held together in a mounting housing 24 which is in the form of a hood and from which the rolling side of the running roller 15 projects. Optionally, the bearing body 18 is guided displaceably in the mounting housing 24 at a right angle to the bearing surface 20, that is to say vertically in the mounting position of the sliding door roller fitting 10. An adjusting screw 25, which is screwed in the mounting housing 24 at one end and is supported on the bearing body 17 at the other end, can be used to set how far the bearing body 18 can be inserted into the mounting housing 24.

As shown in FIG. 5, the free ends of the short lever arms 14 of the two sliding door roller fittings are each directed rearwardly.

Figure 6:
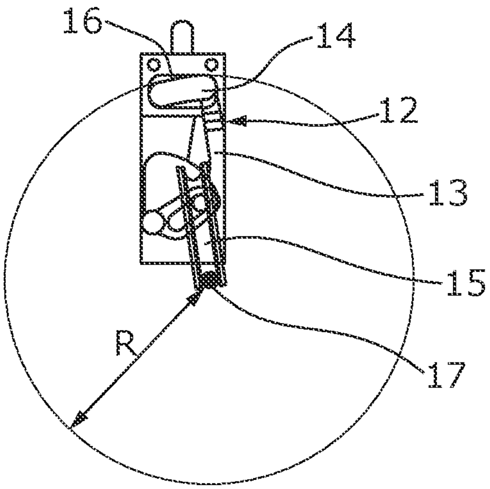
FIG. 6 shows the sliding door roller fitting according to the invention with a tilting lever and with the radius of curvature of a curved outer side of the tilting lever.

As further shown in FIG. 6, the bearing body 18 has, on both sides of the running roller 15, an axle pin 26 which is mounted so as to be rotatable in the bearing body 18 about an axis of rotation extending parallel to the tilting or rolling axis. The axle pins 26 preferably project from the bearing body 18. The pivoting movement of the tilting lever 12 and the rotation of the axle pins 26 are movement-coupled to one another, here by means of a pivoting lever 27 which protrudes radially on the axle pin 26 and on which the long arm 13 of the tilting lever 12 acts eccentrically. More precisely, the pivoting lever 27 has a radial guide slot 28 in which a lateral pin 29 of the long arm 13 is displaceably guided. Optionally, a wedge element 30 having an end-side wedge surface 31 can also be fastened, for example clipped, onto the front of the mounting housing 24. With the sliding door roller fitting 10 mounted, the wedge surface 31 engages around the right or left end side of the sliding door 6*a*, 6*b* in order to interact with the wedge surface 31 of the adjacent sliding door 6*b*.

Figure 8:
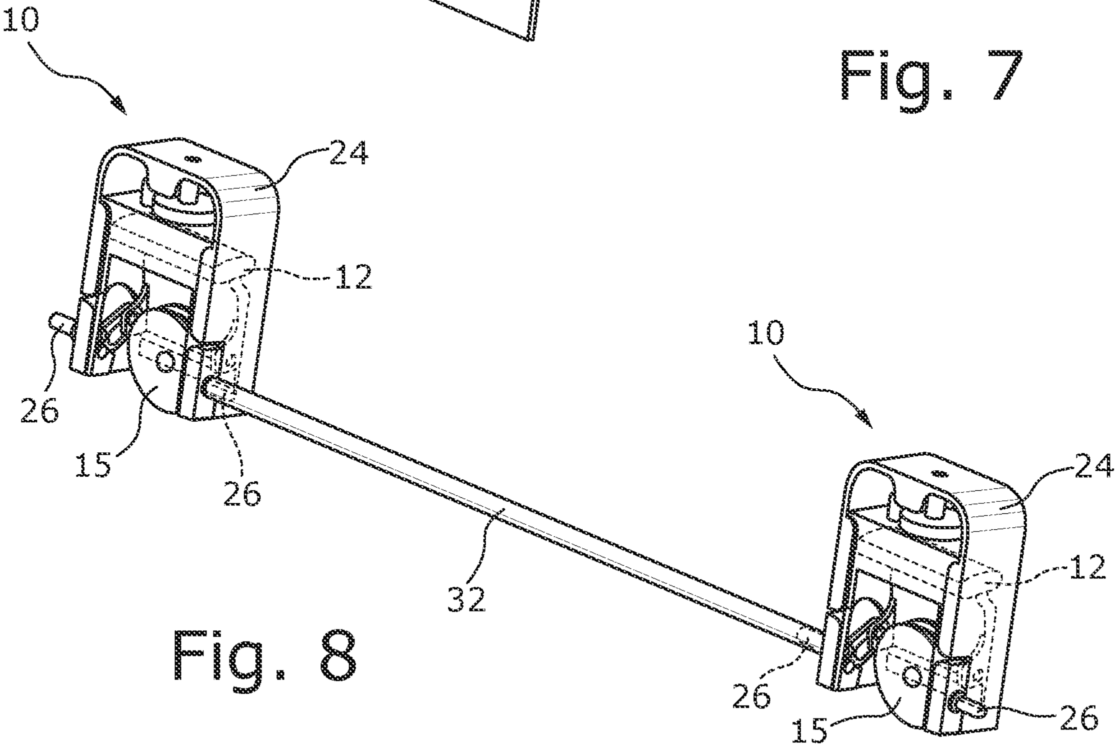
FIG. 8 shows two sliding door roller fittings according to the invention in which the tilting movements of their tilting levers are synchronized by means of a connecting rod.

FIG. 8 shows the two lower sliding door roller fittings 10 of a sliding door in which the tilting movements of their tilting levers 12 are synchronized with one another. For this purpose, the mutually facing axle pins 26 of the two sliding door roller fittings 10 are connected to one another by means of a connecting rod 32 and thus rotationally coupled. Correspondingly, the two upper sliding door roller fittings 10 of the sliding door are also synchronized with one another by means of a connecting rod.

FIGS. 2*a*, 2*b* show the two sliding doors 6*a*, 6*b* in their flush, closed starting position, the sliding door 6*a* guided in the front running rails 7*a*, 8*a* being in its rear setting-out position and the sliding door 6*b* guided in the rear running rails 7*b*, 8*b* being in its front setting-out position. The tilting lever 12 of the sliding door roller fittings 10 for the two sliding doors 6*a*, 6*b* are tilted oppositely to one another, that is to say that the tilting lever 12 of the sliding door roller fitting 10 for the sliding door 6*a* bears against the front end stop 22, and the tilting lever 12 of the sliding door roller fitting 10 for the sliding door 6*b* bears against the rear end stop 22.

If the sliding door 6*b* is manually pressed rearwardly or displaced transversely from its front setting-out position into its rear setting-out position, the sliding door 6*a* is simultaneously also pressed forwardly or displaced transversely from its rear setting-out position into its front setting-out position by means of the wedge surfaces 31, which slide on one another, of the two sliding doors 6*a*, 6*b*. The transverse movement direction is predetermined via wedge surfaces 31 and can be reversed in any desired manner; this also operates with a plurality of sliding doors. If no wedge elements are present, each sliding door 6*a*, 6*b* is individually set out manually. Even if the transverse displacement is initiated only on one side of the sliding door, this transverse displacement is also transmitted by means of the connecting rod 32 to the other side of the sliding door, with the result that the sliding door is always set out parallel.

The transverse displacement of the sliding door 6*a*, 6*b* has the effect that the short arm 14 of the tilting lever 12 is driven along in the setting-out direction 11 by the one driving stop 21. As a result, the tilting lever 12 is tilted from its one stable end position into its other end position, specifically with the running rail, on which the running roller 15 bears, as tilting axis. If the tilting lever 12 is in a middle position between its two end positions, the axis of rotation of the running roller 15 extends horizontally, that is to say parallel to the setting-out direction 11. During the tilting movement, the curved outer surface 16 rolls on the horizontal bearing surface 20, wherein the respective rolling contact always lies vertically above the running rail and there therefore occurs no lowering or lifting of the sliding door 6*a*, 6*b* owing to the radius of curvature R. Consequently, the force required for transversely moving the sliding door 6*a*, 6*b* is very low. The two sliding doors 6*a*, 6*b* are thus spaced transversely from one another to such an extent that they can be slid past one another (FIGS. 3*a*, 3*b*).

The setting-out movement of the sliding doors 6*a*, 6*b* back into their flush, closed starting position occurs by means of a transverse movement of the sliding doors 6*a*, 6*b* in the opposite setting-out direction 11. The transverse displacement of the sliding door 6*a*, 6*b* has the effect that the short arm 14 of the tilting lever 12 is driven along in the setting-out direction 11 by the other driving stop 21 and the tilting lever 12 tilts back into the original end position. Here too, there occurs no lowering or lifting of the sliding door 6*a*, 6*b*.

The height distance between the sliding door 6*a*, 6*b* and bearing body 18 and thus the height of the sliding door 6*a*, 6*b* with respect to the running rail can be set by way of the adjusting screw 25, in particular also subsequently.

Instead of, as shown, being L-shaped with a short arm angled on one side, alternatively the short arm 14 could also be T-shaped with two short arms angled on both sides.

Instead of the shown two sliding doors which can be set out parallel, according to the invention, also only one of the two sliding doors 6*a*, 6*b* can be formed to be set out parallel. In this case, the one sliding door which can be set out parallel is, in its one setting-out position, flush with the other sliding door which cannot be set out parallel and, in its other setting-out position, is spaced apart from the other sliding door which cannot be set out parallel, in the setting-out direction to such an extent that they can be slid past one another.

What is claimed is:

1. A sliding door roller fitting, suitable for the parallel setting-out of a vertical sliding door, which is guided displaceably along a horizontal running rail, in a setting-out direction extending at a right angle to the sliding door plane, comprising:

a tilting lever having a long arm and a short arm which is angled, wherein the long arm has, on its inner side facing the short arm, a freely rotatably mounted running roller which, on the roller side opposite the short arm, projects beyond the long arm in order to roll along a running rail, and wherein the short arm has an outwardly curved outer side facing away from the running roller, wherein an angle between the long arm and the short arm is fixed; and a sliding door-side bearing body on which the tilting lever is held so as to be tiltable between two end positions about a tilting axis parallel to a running roller tangent, wherein the bearing body has at least one planar bearing surface which extends horizontally in the setting-out direction in the mounting position of the bearing body, wherein the short arm of the tilting lever bears by its curved outer side against the bearing surface and performs a rolling motion thereon during tilting of the tilting lever, and wherein the bearing body has two driving stops between which the tilting lever is arranged in order to be driven along bidirectionally in the setting-out direction by the bearing body.

2. The sliding door roller fitting according to claim 1, wherein the curved outer side is part of a shell of a cylinder and lies on a radius of curvature (R) whose centre point is provided by the running roller tangent of the rolling point, which projects furthest beyond the long arm, of the running roller.

3. The sliding door roller fitting according to claim 1, wherein the tilting lever is L-shaped with a short arm angled on one side or T-shaped with two short arms angled on both sides.

4. The sliding door roller fitting according to claim 1, wherein the two ends, which point in the setting-out direction, of the short arm of the tilting lever are rounded and are mounted so as to be tiltable between and on the two driving stops.

5. The sliding door roller fitting according to claim 1, wherein the two end positions of the tilting lever are defined by end stops of the bearing body against which at least one of the two arms of the tilting lever bears in each case in the two end positions.

6. The sliding door roller fitting according to claim 1, wherein the bearing body has a bearing cavity in which the short arm of the tilting lever is tiltably mounted, wherein the bearing cavity has the bearing surface, the driving stops and optionally also end stops against which the short arm of the tilting lever bears in each case in the two end positions.

7. The sliding door roller fitting according to claim 1, wherein, at least on one side of the running roller or on both sides of the running roller, the bearing body has an axle pin which is mounted so as to be rotatable in the bearing body about an axis of rotation extending parallel to the tilting axis, wherein the pivoting movement of the tilting lever and the rotation of the axle pin are movement-coupled to one another.

8. The sliding door roller fitting according to claim 7, wherein the axle pin has a radial pivoting lever on which the tilting lever acts eccentrically.

9. The sliding door roller fitting according to claim 1, wherein the bearing body is formed from two bearing body halves which are assembled in the axial direction of the tilting axis of the tilting lever and which have in each case mutually facing bearing cavities in which the short arm of the tilting lever is tiltably mounted.

10. The sliding door roller fitting according to claim 1, wherein the bearing body is guided displaceably in a sliding door-side mounting housing at a right angle to the bearing surface, and in that an adjustable screw is supported, on the one hand, on the bearing body and, on the other hand, on the mounting housing in order to set how far the bearing body can be inserted into the mounting housing.

11. The sliding door roller fitting according to claim 1, wherein a wedge element which is fastened to the sliding door roller fitting and which has an end-side wedge surface which, in the mounted state, is arranged laterally in front of an end side of the sliding door.

12. A sliding door arrangement, comprising:

at least one stationary wall; and at least one sliding door which can be shifted parallel to the stationary wall and is guided displaceably in a horizontal lower and a horizontal upper running rail by means of at least two lower and two upper sliding door roller fittings according to claim 1 whose bearing bodies are each fastened to the sliding door and whose running rollers are each guided in the respective running rails;

wherein the sliding door can be set out parallel in a horizontal setting-out direction, which extends at a right angle to the sliding door plane, between a first setting-out position, in which the tilting lever is tilted into the one end position, and a second setting-out position, in which the tilting lever is tilted into the other end position; and wherein, if the sliding door is in the first setting-out position, the sliding door abuts the stationary wall in the setting-out direction or is flush with the stationary wall and, if the sliding door is in the second setting-out position, is spaced apart from the stationary wall in the setting-out direction to such an extent that the sliding door can be slid past the stationary wall.

13. A sliding door arrangement, comprising:

at least two parallel horizontal, lower running rails and at least two parallel horizontal, upper running rails;

at least one first sliding door which is guided displaceably in the front running rail of the two lower running rails and in the front running rail of the two upper running rails by means of at least two lower and two upper sliding door roller fittings; and at least one second sliding door which is guided displaceably in the rear running rail of the two lower running rails and in the rear running rail of the two upper running rails by means of at least two lower and two upper sliding door roller fittings;

wherein at least one of the first and second sliding doors is guided displaceably by means of at least two lower and two upper sliding door roller fittings according to claim 1 whose bearing bodies are each fastened to the first or second sliding door and whose running rollers are each guided in the respective running rails;

wherein the first or second sliding door can be set out parallel in a horizontal setting-out direction, which extends at a right angle to the sliding door plane, between a first setting-out position, in which the tilting lever is tilted into the one end position, and a second setting-out position, in which the tilting lever is tilted into the other end position; and wherein, if the at least one sliding door is in the first setting-out position, the two sliding doors are flush with one another and, if the at least one sliding door is in second setting-out position, are spaced apart from one another in the setting-out direction to such an extent that they can be slid past one another.

14. The sliding door arrangement according to claim 13, wherein the first sliding door is guided displaceably by means of the at least two lower and two upper sliding door roller fittings whose bearing bodies are each fastened to the first sliding door and whose running rollers are each guided in the lower and upper running rails, wherein the first sliding door can be set out parallel in a horizontal setting-out direction, which extends at a right angle to the sliding door plane, between a rear setting-out position, in which the tilting lever is tilted into the one end position, and a front setting-out position, in which the tilting lever is tilted into the other end position; and the second sliding door is guided displaceably by means of the at least two lower and two upper sliding door roller fittings whose bearing bodies are each fastened to the second sliding door and whose running rollers are each guided in the lower and upper running rails, wherein the second sliding door can be set out parallel in the setting-out direction between a front setting-out position, in which the tilting lever is tilted into the one end position, and a rear setting-out position, in which the tilting lever is tilted into the other end position;

wherein, if the first sliding door is in its rear setting-out position and the second sliding door is in its front setting-out position, the two sliding doors are flush with one another and, if the first sliding door is in its front setting-out position and the second sliding door is in its rear setting-out position, are spaced apart from one another in the setting-out direction to such an extent that they can be slid past one another.

15. The sliding door arrangement according to claim 12, wherein, at least on one side of the running roller or on both sides of the running roller, the bearing body has an axle pin which is mounted so as to be rotatable in the bearing body about an axis of rotation extending parallel to the tilting axis, wherein the pivoting movement of the tilting lever and the rotation of the axle pin are movement-coupled to one another, by means of a lever mechanism or a toothed wheel mechanism or rack mechanism;

wherein mutually facing axle pins of two lower sliding door roller fittings of a sliding door and mutually facing axle pins of two upper sliding door roller fittings of a sliding door are each connected to one another by means of a connecting rod and thus rotationally coupled.

16. The sliding door arrangement according to claim 13, wherein, at least on one side of the running roller or on both sides of the running roller, the bearing body has an axle pin which is mounted so as to be rotatable in the bearing body about an axis of rotation extending parallel to the tilting axis, wherein the pivoting movement of the tilting lever and the rotation of the axle pin are movement-coupled to one another, by means of a lever mechanism or a toothed wheel mechanism or rack mechanism;

wherein mutually facing axle pins of two lower sliding door roller fittings of a sliding door and mutually facing axle pins of two upper sliding door roller fittings of a sliding door are each connected to one another by means of a connecting rod and thus rotationally coupled.

* * * * *